United States Patent
Bierhoff et al.

(10) Patent No.: US 6,512,732 B1
(45) Date of Patent: *Jan. 28, 2003

(54) DEVICE FOR OPTICALLY SCANNING INFORMATION TRACKS ON A PLANE USING TWO SUBBEAMS

(75) Inventors: Martinus P. M. Bierhoff, Eindhoven (NL); Antonius H. M. Akkermans, Eindhoven (NL); Peter Coops, Eindhoven (NL); Jozef P. H. Benschop, Eindhoven (NL)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/764,830

(22) Filed: Dec. 12, 1996

(30) Foreign Application Priority Data

Dec. 21, 1995 (EP) .............................. 95203592

(51) Int. Cl.$^7$ ................................. G11B 7/00
(52) U.S. Cl. ............................ 369/109.02; 369/112.01; 369/44.41
(58) Field of Search ................ 369/112.01, 110, 369/109.02, 44.41, 44.42, 44.23, 44.24

(56) References Cited

U.S. PATENT DOCUMENTS

| | | | |
|---|---|---|---|
| 4,665,310 A | | 5/1987 | Heemskerk ............... 250/201 |
| 4,724,533 A | | 2/1988 | Ohara et al. ............. 369/44.12 |
| 5,243,585 A | | 9/1993 | Hoshimo et al. ........ 369/44.41 |
| 5,406,543 A | * | 4/1995 | Kobayashi et al. ......... 369/109 |
| 5,410,529 A | * | 4/1995 | Kurata et al. ............... 369/109 |
| 5,436,876 A | * | 7/1995 | Yokoyama et al. ......... 369/109 |
| 5,511,059 A | * | 4/1996 | Brazas, Jr. .................. 369/109 |
| 5,523,989 A | * | 6/1996 | Ishibashi .................... 369/109 |
| 5,553,050 A | * | 9/1996 | Yang .......................... 369/109 |
| 5,570,333 A | * | 10/1996 | Katayama ................... 369/109 |
| 5,579,298 A | * | 11/1996 | Opheij et al. ............... 369/109 |
| 5,594,712 A | * | 1/1997 | Yang .......................... 369/109 |
| 5,627,812 A | * | 5/1997 | Yamamoto et al. ......... 369/109 |

FOREIGN PATENT DOCUMENTS

| | | |
|---|---|---|
| EP | 0228620 A2 | 7/1987 |
| EP | 0273356 A2 | 7/1988 |
| EP | 0372629 A2 | 6/1990 |
| EP | 0583036 A2 | 2/1994 |

* cited by examiner

*Primary Examiner*—Nabil Hindi
(74) *Attorney, Agent, or Firm*—Michael E. Belk

(57) ABSTRACT

A device for optically scanning an information plane having tracks. Radiation is supplied by a radiation source focused on the information plane by an objective system. The beam reflected by the information plane is incident on a dividing element, for example a grating which divides the beam into two halves along a dividing line. Two sub-gratings at both sides of the dividing line each form a detection beam from one half of the beam, which detection beams are detected each by a detector. A focus error signal is generated from the detector signals by forming a difference signal of the two detector signals and dividing this difference signal by the sum signal of the two detector signals. The focus error signal is relatively insensitive to the position accuracy of the detectors with respect to the detection beams.

9 Claims, 2 Drawing Sheets

DEVICE FOR OPTICALLY SCANNING INFORMATION TRACKS ON A PLANE USING TWO SUBBEAMS

BACKGROUND OF THE INVENTION

The invention relates to a device for optically scanning an information plane having tracks, the device comprising a radiation source for supplying a radiation beam, means for focusing the radiation beam to a scanning spot on the information plane, a dividing element comprising a first and second area at both sides of a dividing line and arranged in the optical path of radiation from the information plane for forming a first and a second detection beam from the first and second area respectively, a first detector arranged in the optical path of the first detection beam, a second detector arranged in the optical path of the second detection beam, and an electrical circuit for combining output signals of the detectors to produce a focus error signal. The focus error signal may be used in a focus servo loop which controls the longitudinal position of the scanning spot in order to keep the scanning spot in the information plane.

A device of this type which can be used, inter alia, in apparatuses for writing and reading information in the tracks of optical record carriers and is known from U.S. Pat. No. 5,243,585. In the third embodiment described in this document the focus error signal is formed by a split detector irradiated by one beam. The focus error signal is formed as the difference signal of the output signals of the two detectors divided by the sum signal of the two detector signals. A drawback of the known device is that the focus error signal is relatively strongly affected by manufacturing tolerances in the position of the detectors with respect to the detector beams. The above citation is hereby incorporated in whole by reference.

SUMMARY OF THE INVENTION

The present invention has for an object to provide a scanning device in which the focus error signal is less sensitive to the position of the detectors.

To this end the scanning device according to the invention is characterized in that the electrical circuit is arranged to form the difference signal of the output signal of the first detector and the second detector and dividing the difference by the sum signal of said two output signals. A shift of the position of the combination of the two detectors in the XY plane changes the amount of radiation intercepted by each detector in the same way. The focus error signal formed according to the invention takes this fact into account, and is therefore less sensitive to a shift of the detectors from the intended position compared to the known scanning device. The invention especially reduces the influence of the position of the combination of the detectors on the slope of the focus error signal as a function of the longitudinal position of the scanning spot. This reduction stabilizes the focus servo loop.

A preferred embodiment of the device according to the invention is characterized in that the first detector and a third detector are disposed on two sides of a first line, and the second detector and a fourth detector are disposed on two sides of a second line, the first and second line being substantially parallel to the dividing line, the circuit forming a focus error signal proportional to $(S_a-S_b)/(S_a+S_b)$ and to $(S_d-S_c)/(S_a+S_c)$, in which $S_a$, $S_b$, $S_c$ and $S_d$ are the output signals of the first, second, third and fourth detector respectively. The combination of the two difference signals provides a focus error signal which is tolerant for both position errors of the detectors and the position of the dividing line in the reflected beam. Moreover, the combination doubles the focus error signal as compared to the single difference signal. Lines are substantially parallel when the angle between the lines is smaller than about 30°.

A further embodiment of the device according to the invention, allowing push-pull radial tracking and providing a low radial-to-focus crosstalk is characterized in that the areas are located symmetrically at both sides of a dividing line of the dividing element, the angle between the dividing line and an effective direction of the tracks being between 15° and 80°. Radial-to-focus crosstalk is the deterioration of the focus error signal when scanning the spot over the information plane in a direction perpendicular to the tracks.

A special embodiment of the device according to the invention is characterized in that the dividing element comprises a diffraction grating and each area comprises a sub-grating. A grating is a relatively cheap element performing the two functions of redirecting part of the radiation from the record carrier to the detection system and splitting the reflected radiation into two detection beams.

BRIEF DESCRIPTION OF THE DRAWINGS

These and other aspects of the invention will be apparent from and elucidated with reference to the embodiments described hereinafter in conjunction with the following drawings, in which.

DESCRIPTION OF THE PREFERRED EMBODIMENTS

Figure 1:
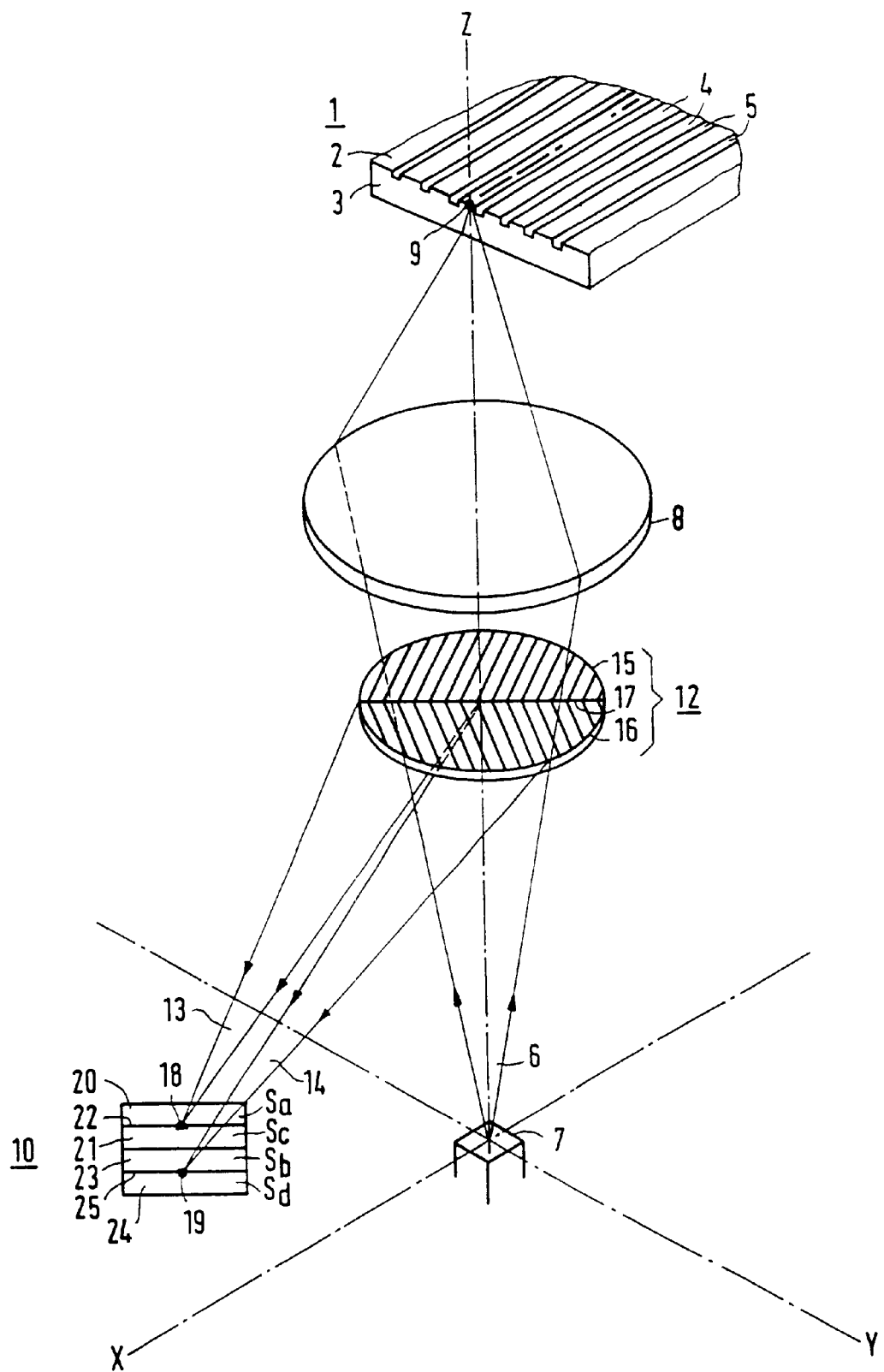
FIG. 1 shows diagrammatically a device according to the invention.

Identical reference numerals in the different Figures denote identical elements.

FIG. 1 shows part of an optical record carrier 1 with a radiation-reflecting information plane 2 and a transparent substrate 3. The Figure shows a number of tracks 4, separated or not separated by intermediate areas 5, for example grooves. The tracks extend in the X direction of a coordinate system XYZ shown in the Figure, in which the information plane is parallel to the X-Y plane. The information is recorded on the record carrier in the form of optically readable areas, ordered in the tracks and having a width equal to or smaller than the width of the track. FIG. 1 shows some of these areas. The areas may have the form of, for example, pits or bumps or areas having a reflection different from that of its surroundings, or magnetic domains with a direction of magnetization different from that of its surroundings. The information plane is scanned by a scanning beam 6 emitted by a radiation source 7, for example a diode laser whose centre coincides with the origin O of the coordinate system XYZ. This beam is focused on the information plane to a small scanning spot 9 by an objective system 8, diagrammatically shown by means of a single lens. A separate collimator lens may be arranged between the radiation source and the objective system. If the record carrier is disc-shaped, the tracks can be scanned by rotating the record carrier about an axis parallel to the Z axis. The entire information plane is scanned by moving the record carrier and the optical system of source, lens and detection system 10 in the radial direction, i.e. the Y direction, with respect to each other.

It must be possible to detect the beam reflected by the information plane and modulated by the information and the track structure, for which purpose this beam must be separated from scanning beam 6 towards the information plane. To this end the device may be provided with a dividing element 12, in the Figure shown in the form of a grating, which deflects the reflected beam from the path of the projected beam 6. For the focus error detection according to the Foucault method the reflected beam is split into two scanning detection beams 13 and 14 and detection system 10 comprises at least two detectors 20 and 23, the first detector 20 cooperating with the first detection beam 13 and the second detector 23 cooperating with the second detection beam 14.

As described in U.S. Pat. No. 4,665,310, the beam separation and the beam splitting can be performed by one diffraction element. This element 12 splits the beam reflected by the information plane and passing through the objective system 8 into a non-diffracted zero-order sub-beam and a plurality of sub-beams of the first and higher orders. Preferably, the first-order sub-beams are diffracted as detection beams towards the detection system 10. The part of the radiation emitted by the source 7 and being incident on the detection system can be adjusted by a choice of the grating parameters, notably the ratio between the width of the grating grooves and that of the areas between the grating grooves and the depth and the shape of the grooves.

Grating 12 shown in FIG. 1 comprises a first and a second area 15 and 16, each having a sub-grating at both (i.e. opposite) sides of a dividing line 17, which is shown in a direction of 45° with both the +X axis and the −Y axis. The grating lines in each sub-grating shown in the Figure are parallel, while the lines of the first sub-grating extend at a first angle and those of the second sub-grating extend at a second, equally large but opposite angle to the dividing line 17. The grating lines of the gratings actually used often have a substantially hyperbolic shape and are substantially mutually parallel. Such gratings may also have an optical strength, for example if there is a height difference between radiation source 7 and the detection system 10. The detection beams 13 and 14 diffracted by the sub-gratings 15 and 16 each have a direction substantially perpendicular to the grating lines of the associated sub-grating. The radiation spots 18 and 19 formed by the detection beams 13 and 14 in the X-Y plane are offset with respect to each other in a direction under 45° with respect to the X and Y axis. The detection system 10 for detecting the detection beams comprises at least two detectors 20 and 23. The detectors are arranged in such a way that half of the power in each of the radiation spots 18 and 19 is incident on detectors 20 and 23 respectively, when the scanning beam 6 is correctly focused on the information plane 2. When the intensity distribution of the radiation spots is rotationally symmetric, this means that the centres of gravity of the intensity distributions are on bounding lines 22 and 25 of detectors 20 and 23 respectively. When a focus error occurs, the centres of gravity of the radiation distribution of the spots 18 and 19 are displaced either towards or away from each other, dependent on the direction of the focus error. The focus error signal is formed by a modified single-Foucault method. If the output signals of the detectors 20 and 23 are represented by $S_a$ and $S_b$, the focus error signal $S_{f1}$ according to the invention $S_f$ is given by:

$$S_{f1}=(S_a-S_b)/(S_a+S_b).$$

When the combination of detectors 20 and 23 is not arranged on the desired position, but has been displaced due to positioning tolerances, for instance in a direction under 45° with respect to the +X and +Y axis, i.e. perpendicularly to bounding lines 22 and 25, the centre of the spots 18 and 19 will no longer fall on bounding lines 22 and 25 respectively. However, the amounts of light intercepted by detectors 20 and 23 will increase in the same way. Hence, the difference signal $(S_a-S_b)$ also increase. After normalisation of the difference signal by dividing the difference signal by the sum signal $(S_a+S_b)$, the focus error signal is to first order equal to the focus error signal obtained from a perfectly positioned detection system.

Figure 2:
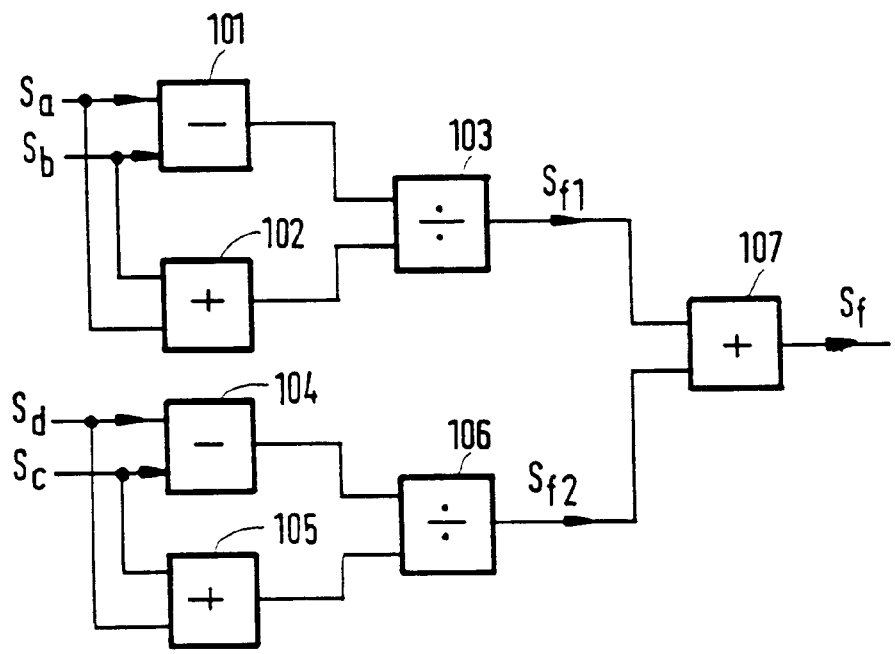
FIG. 2 shows an electronic circuit for generating a focus error signal.

FIG. 2 shows an electronic circuit for forming the focus error signal $S_{f1}$ from the output signals $S_a$ and $S_b$ of the detectors. The signal $S_b$ is subtracted from signal $S_a$ in a subtraction circuit 101. The signals $S_a$ and $S_b$ are added in an addition circuit 102. The output signal of circuit 101 is divided by the output signal of circuit 102 in a dividing circuit 103. The output signal of circuit 103 is the desired focus error signal $S_{f1}$.

Another embodiment of the scanning device according to the invention comprises two further detectors arranged in detection beams 13 and 14. These detectors are indicated as elements 21 and 24 in FIG. 1. Detectors 20 and 21 form a split detector with bounding line 22 as dividing line. Likewise, detectors 23 and 24 form a split detector with bounding line 25 as dividing line. If the output signals of the detectors 21 and 24 are represented by $S_c$ and $S_d$, a focus error signal $S_{f2}$ according to the invention is given by:

$$S_{f2}=(S_d-S_c)/(S_d+S_c).$$

FIG. 2 shows the electronic circuit for forming $S_{f2}$, which is equivalent to the circuit for forming $S_{f1}$. A subtraction circuit 104 forms the difference signal of $S_d$ and $S_c$, whereas an addition circuit 105 forms the sum signal of $S_d$ and $S_c$. A division circuit 106 divides the difference signal by the sum signal. The output signal of circuit 106 is focus error signal $S_{f2}$.

In a further embodiment focus error signals $S_{f1}$ and $S_{f2}$ are added to form a focus error signal $S_f$ according to the invention defined by $$S_f=(S_a-S_b)/(S_a+S_b)+(S_d-S_c)/(S_d+S_c).$$

This method of forming the focus error signal is a modified double-Foucault method. In the electronic circuit shown in FIG. 2 signal $S_f$ is formed by addition circuit 107, which has signals $S_{f1}$ and $S_{f2}$ as input and $S_f$ as output. Each of the three signals $S_f$, $S_{f1}$ and $S_{f2}$ may be used as input for a servo circuit for controlling the position of objective system 8 in the Z direction and thereby the position of the scanning spot 9 in a direction perpendicular to information plane 2. Signal $S_f$ has the advantage that its magnitude is twice that of signals $S_{f1}$ and $S_{f2}$.

When the radial tracking error signal is not formed by the so-called push-pull method, dividing line 17 is preferably oriented along the Y axis in order to avoid radial-to-focus crosstalk.

When the angle between dividing line 17 and the effective track direction (the direction of the X axis in the figure) is chosen in the range between 15° and 80°, the tracking error signal can be formed in the entire range by means of the push-pull method. Moreover, an angle in this range gives the additional advantage that the radial-to-focus crosstalk in the focus error signal is reduced. The crosstalk is also dependent on the distance between the detectors and the grating. It is found that this dependence is minimal if the dividing line angle is between 30° and 60°. This sub-range has the additional advantage that the crosstalk itself is small in this range. The minimum crosstalk is around a dividing line angle of 45° for different devices and record carriers. The embodiment shown in FIG. 1 has a dividing line angle of 45°, which is the angle between dividing line 17 and the X direction.

Similarly as in the devices shown in FIG. 1 and as known from European Patent Application no. 0 372 629, the bounding lines 22 and 25 are directed substantially towards the radiation source 7. This has been done with a view to possible changes of the wavelength of the radiation generated by the laser diode, which changes may be caused by, for example, a change of the temperature of or of the current through the laser diode. If the detection systems and the laser diode are not coplanar but have a different height, the bounding lines may be directed towards the optical axis of the zero-order beam of the diffraction element 12, i.e. the Z axis in FIG. 1 instead of towards the laser diode.

The form of sub-gratings 15, 16 and the orientation of the detectors 20, 21, 23, 24 are not restricted to the form and orientation shown in FIG. 1. The at least one detector for intercepting detection beam 13 may be spaced apart from the at least one detector for intercepting detection beam 14. Such a configuration is shown in FIG. 1 of European patent application nr. 583 036.

The generation of a focus error signal according to the invention is also applicable in a device in which the radial tracking error signal is generated by the so-called three-beam method. Such a device is shown in FIG. 5 and, with special orientations, in FIGS. 6A and 6B of the aforementioned European patent application nr. 583 036. The focus error signal according to the invention is formed from the output signals $S_a$, $S_b$, $S_c$ and $S_d$ of detectors 20, 23, 21 and 24 respectively in said FIGS. 5 and 6A, B.

The generation of a focus error signal according to the invention is also applicable in a device in which a radial tracking error signal is generated by the so-called three-beam push-pull method, also referred to as differential push-pull, and shown in FIG. 7 and, with a special orientation, in FIG. 8 of said European patent application nr. 583 036. The focus error signal is formed from the output signals $S_a$, $S_b$, $S_c$ and $S_d$ of detectors 20, 23, 21 and 24 respectively in said FIGS. 7 and of detectors 20, 23, 21 and 25 in said FIG. 8.

The scanning device shown in FIG. 1 has a grating 12 which is radiation transmissive. However, the present invention is also applicable in a device having a radiation-reflecting grating. An embodiment of such a device is shown in FIG. 9 of said European patent application nr. 583 036.

In the embodiments of the device according to the invention described so far, the detection beams are generated by means of a grating as a dividing element. However, the invention is not limited thereto but is applicable in all devices in which the beam from the information plane is divided into two detection beams by a dividing element. For example, it is possible to use a slightly prismatic dividing plate as a dividing element. Each of the two areas of the dividing element then comprises a face of the prism. The dividing plate is arranged in the beam going towards the detection system. An advantage of the dividing plate is that the direction of the detection beams is hardly dependent on the wavelength of the radiation.

The described embodiments have detection system 10 arranged in the direction of dividing line 17. Other embodiments can be made by arranging detection system 10 at any other location in the XY plane and at the same time changing the direction of the grating lines in sub-gratings 15 and 16 such that detection beams 13 and 14 are directed to detection system 10. The split detectors 20, 21 and 23, 24 need not be juxtaposed, but may be arranged a distance apart.

The focus error signal in the devices shown is generated by means of the single or double-Foucault method. The invention is also applicable in devices in which the focus error signal is generated by means of the beam-size method which is known per se from U.S. Pat. No. 4,724,533. The scanning detection beams 13 and 14 are then focused at different distances from the dividing element by areas 15 and 16 having a different optical strength.

Figure 3:
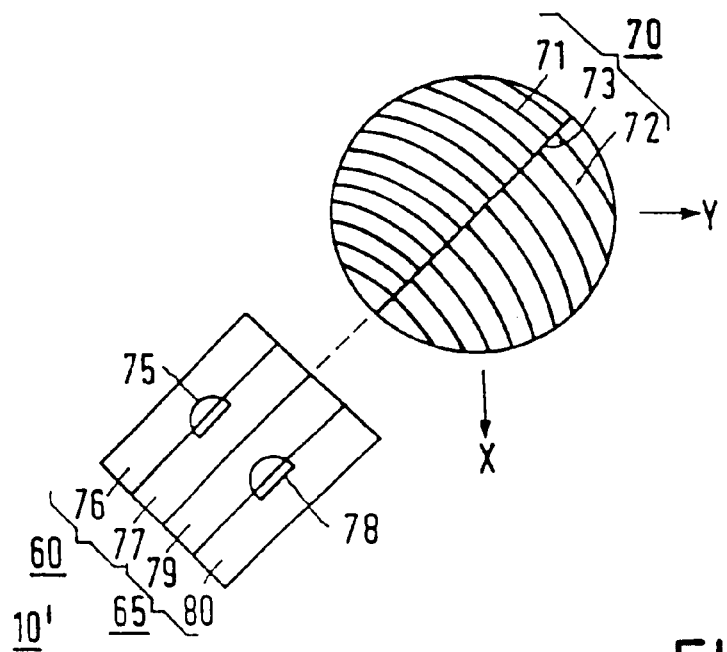
FIG. 3 shows schematically the configuration of the dividing element and detection system for the beam-size method.

FIG. 3 shows a dividing element for the beam-size method in the form of a diffraction element and an associated detection system 10' for use of the beam-size method in a device as shown in FIG. 3. The diffraction element 70 comprises two sub-gratings 71 and 72 at both sides of a dividing line 73. Each sub-grating has curved grating lines and a different optical strength. The detection beam formed by sub-grating 71 is focused below the plane of the detection system 10' and forms a radiation spot 75 on the split detector 60 comprising two detectors 76 and 77. The detection beam formed by a sub-grating 72 is focused above the plane of the detection system 10 and forms a radiation spot 78 on the split detector 65 comprising two detectors 79 and 80. The Figure shows the situation in which the scanning beam 6 is focused properly on information plane 2 and the radiation spots 75 and 78 are thus equally large. When the output signals of the detectors 76, 77, 79 and 80 are designated as $S_a$, $S_c$, $S_b$ and $S_d$, the focus error signal $S_f'$ according to the invention is given by:

$$S_f'=(S_a-S_b)/(S_a+S_b)+(S_d-S_c)/(S_d+S_c).$$

The electronic circuit for forming the focus error signal from the detector output signals is equivalent to the circuit shown in FIG. 2. The focus error signal is relatively insensitive to the actual position of the detection system 10'. A displacement of the detection system along dividing line 73 does not introduce an offset in the focus error signal by virtue of the fact that the bounding lines between detectors 76 and 77 and between detectors 79 and 80 are substantially parallel to dividing line 73 of dividing element 70. A displacement of the detection system perpendicular to bounding line 73 also does not affect, in first order, the focus error signal.

It will be evident that said embodiment of the device in which a focus error signal is generated by means of the beam-size method can be combined with the generation of a tracking error signal in accordance with the normal or differential push-pull method or by means of two auxiliary beams as described in said European Patent application nr. 583 036.

What is claimed is:

1. A device for optically scanning an information plane having tracks, comprising:

a radiation source for supplying a radiation beam;

means for focusing the radiation beam to a scanning spot on the information plane;

dividing element means including a first and second area at opposite sides of a dividing line and arranged in the optical path of radiation from the information plane for forming a first and a second detection beam from the first and second area respectively;

a first detector arranged in the optical path of the first detection beam;

a second detector arranged in the optical path of the second detection beam; and electrical circuit means for combining output signals of the first and second detectors to produce a focus error signal; said electrical circuit means comprising;

means for forming a difference signal of the output signal of the first detector and the output signal of the second detector;

means for forming a sum signal of the first and second output signals; and means for dividing the difference signal by the sum signal to produce said focus error signal.

2. The device of claim 1 wherein the first detector includes first and second detector portions disposed on two sides of a first line, and the second detector includes third and fourth detector portions disposed on two sides of a second line, the electrical circuit means forming a focus error signal proportional to the sum of $(S_a-S_b)/(S_a+S_b)$ and $(S_d-S_c)(S_d+S_c)$, in which $S_a$, $S_b$, $S_c$ and $S_d$ are the output signals of the first, third, seconds and fourth detector portions respectively.

3. The device of claim 1, wherein the areas are located symmetrically at both sides of a dividing line of the dividing element means, the angle between the dividing line and an effective direction of the tracks being between 15° and 80°.

4. The device of claim 1, wherein the dividing element means includes a diffraction grating and each area comprises a sub-grating.

5. The device of claim 2, wherein the areas are located symmetrically at both sides of a dividing line of the dividing element means, the angle between the dividing line and an effective direction of the tracks being between 15° and 80°.

6. The device of claim 2, wherein the dividing element means includes a diffraction grating and each area comprises a sub-grating.

7. The device of claim 3, wherein the dividing element means includes a diffraction grating and each area comprises a sub-grating.

8. The device of claim 2 wherein the first and second line are substantially parallel to the dividing line.

9. The device of claim 1 wherein the first detector includes first and second detector portions disposed on two sides of a first line, and the second detector includes third and a fourth detector portions disposed on two sides of a second line, each portion providing an output signal, and the means for forming a difference signal of the output signal of the first detector and the output signal of the second detector is connected to form a difference signal between the output of one of the portions of the first detector and the output of one of the portions of the second detector.

* * * * *